(12) United States Patent
Monette et al.

(10) Patent No.: US 6,240,971 B1
(45) Date of Patent: Jun. 5, 2001

(54) COMPOSITE STRUCTURES HAVING IMPROVED CONTAINMENT STRENGTH

(75) Inventors: Liza M. Monette, Annandale, NJ (US); Michael P. Anderson, The Woodlands, TX (US); Russell R. Mueller, Washington; Cary N. Marzinsky, Stockton, both of NJ (US); Allen S. Chiu, The Waterside (SG)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/410,582

(22) Filed: Oct. 1, 1999

Related U.S. Application Data

(63) Continuation-in-part of application No. 08/833,157, filed on Apr. 4, 1997, now abandoned.

(51) Int. Cl.[7] .................. F16L 11/00; F16L 9/14
(52) U.S. Cl. .................. 138/153; 138/134; 138/141
(58) Field of Search .................. 138/129, 130, 138/131, 141, 144, 134

(56) References Cited

U.S. PATENT DOCUMENTS

| | | | |
|---|---|---|---|
| 2,843,153 | 7/1958 | Young | 135/55 |
| 3,649,338 * | 3/1972 | Ishida | 117/97 |
| 3,784,429 | 1/1974 | Muller | 156/175 |
| 3,790,438 | 2/1974 | Lewis | 161/172 |
| 4,175,992 | 11/1979 | Grawey | 156/143 |
| 4,330,811 * | 5/1982 | Bordner | 361/212 |
| 4,385,644 | 5/1983 | Kaempen | 138/109 |
| 4,515,737 * | 5/1985 | Karino et al. | 264/22 |
| 4,657,049 | 4/1987 | Fourty et al. | 138/133 |
| 4,693,281 * | 9/1987 | Creedon | 138/130 |
| 4,728,224 | 3/1988 | Salama | 405/195 |
| 4,860,798 * | 8/1989 | Kovacs et al. | 138/130 |
| 4,868,038 | 9/1989 | McCullough, Jr. et al. | 428/222 |
| 5,091,230 | 2/1992 | Fuchs et al. | 428/36.4 |
| 5,213,379 | 5/1993 | Taniguchi et al. | 285/390 |
| 5,324,558 | 6/1994 | Muto et al. | 428/36.91 |
| 5,439,323 | 8/1995 | Nance | 405/195.1 |
| 5,512,119 | 4/1996 | Takezawa et al. | 156/171 |
| 5,645,110 | 7/1997 | Nobileau | 138/134 |
| 5,655,572 | 8/1997 | Marena | 138/137 |
| 5,934,335 * | 8/1999 | Hardy | 138/134 |

FOREIGN PATENT DOCUMENTS

| | | | |
|---|---|---|---|
| 825080 | 5/1975 | (BE) . | |
| 88055930 | 4/1988 | (DE) | F16L/11/08 |
| 0524512 | 3/1981 | (EP) | F16L/11/08 |
| 2165331A | 4/1986 | (GB) | F16L/11/08 |

* cited by examiner

Primary Examiner—David A. Scherbel
Assistant Examiner—David Hwu
(74) Attorney, Agent, or Firm—Estelle C. Bakun

(57) ABSTRACT

Composite fiber reinforced structures, such as pipes or storage tanks, having improved resistance to microcracking and delamination and improved containment strength are disclosed. The walls of the structures comprise at least one layer comprising a plurality of continuous reinforcing glass fibers having an average diameter of ≦about 10 microns impregnated in a resinous binder such as a thermoset epoxy resin.

13 Claims, 6 Drawing Sheets

COMPOSITE STRUCTURES HAVING IMPROVED CONTAINMENT STRENGTH

This application is a Continuation-In-Part of U.S. Ser. No. 833,157 filed Apr. 4, 1997.

BACKGROUND OF THE INVENTION

1. Field of the Invention

The invention relates to pipes, tubing and containers having a wall structure composed of fiber reinforced polymer composites.

2. Description of Related Art

Fiber reinforced plastic (FRP) composites are finding increased usage as piping in chemical plants as well as casing used in the drilling of oil and gas wells and casing and tubing for the transport of crude oil and natural gas up from the well source. These materials are also useful in the construction of containers such as pressure vessels and underground or above ground storage tanks.

The advantage of FRP composites over carbon steel structures in oil/gas applications includes superior corrosion resistance, flexibility in achieving mechanical property design targets and improved fatigue resistance. FRP composites are also of considerably lighter weight for a given wall thickness than their steel counterparts.

FRP structures designed for use in high pressure piping or casing such as crude oil pipelines and oil well tubing are generally prepared by impregnating a roving of filaments of a high strength material, such as continuous glass filaments, with a thermosettable resin composition, such as an epoxy resin, and winding the impregnated filaments back and forth onto a mandrel under tension to form a plurality of intermeshed filament windings. Filaments may be wound at an angle of 90° to the pipe axis or at angles of 0° to $\leq+/-90°$, e.g., $\pm 88°$) with respect to the pipe axis, in which latter case a helical filament winding pattern is formed. After a desired pipe wall thickness is achieved, the winding operation is discontinued, the resin is cured and the mandrel is extracted resting in a cylindrical pipe having a fiber reinforced wall structure. FRP pipes of this type and their method of production are disclosed, e.g., in U.S. Pat. Nos. 2,843,153 and 5,330,807, the complete disclosures of which patents are incorporated herein by reference. Larger diameter structures such as containers may be fabricated the same way using larger diameter mandrels.

FRP pipe designed for use in onshore or onshore fossil fuel recovery must be constructed to withstand two basic forces to which it will be subjected. The first force is an outer radial load exerted along a vector normal to the pipe walls by fluids (oil or drilling muds) which are conveyed under moderate to high pressure through the pipe, also known as the hoop load. The second force is an axial tensile load exerted along vectors parallel to the pipe axis and occasioned by the fluid pressure and/or by the weight of a long string of coupled pipe sections for applications where they are suspended, in the ground at the well bore and/or between the well bore and surface platform in offshore recovery operations. These strings are often suspended 3,000 to 10,000 feet (about 850 to 2800 meters), and thus must be able to carry a long term axial stress in excess of about 2500 pounds per square inch (or 2.5 ksi) occasioned during operation and when the pipe sting is inserted and removed during the fossil fuel recovery process. Other structures such as storage tanks and pressure vessels are designed primarily to maximize containment capability in a direction normal to the tank or vessel longitudinal axis, i.e., hoop load.

FRP pipe having maximum hoop strength can be designed if the reinforcing fiber is wound at an angle close to 90° to the pipe axis, e.g., +/-70° up to 90°. Conversely, maximum tensile strength is developed where the reinforcing fiber is applied at an angle close to 0° to the pipe axis, e.g. +/-30° down to 0°. However, pipe wound at or close to 90° exhibits sever diminishment of axial tensile strength while pipe wound at or close to 0° exhibits severe diminishment of hoop strength. Pipe wound at intermediate pipe axis angles between +/-30° to +/-70° (as disclosed in U.S. Pat. No. 2,843,153) generally compromises hoop and particularly axial strength.

One technique for attempting to maximize both hoop and axial strength in pipe manufacture is to lay down the reinforcing fiber composite as separate laminate layers one atop another, each layer having the fibers disposed at different pipe axial angles designed to maximize the hoop or axial stress bearing properties of the pipe as well as minimize the coefficient of expansion of the composite pipe. An example of such a construction containing +/-20° to +/-60° fiber layers alternating with 90° layers is disclosed in U.S. Pat. No. 5,330,807. Other similar layered laminates are disclosed in U.S. Pat. Nos. 4,728,224 and 4,385,644.

FRP composites currently commercially available also may exhibit a serious deficiency which makes their use not cost effective in applications that generate even moderate containment stress. For example, microcracking and delamination of pipe wall structure at or near the pipe joints and/or along the pipe length provide a leak path for fluids, commonly referred to as "weeping", which can occur at fluid pressures which can be 5 to 10 times $\leq$ the pipe short-term burst pressure. Intrusion of water into the pipe wall structure via these microcracks can attack glass fiber surfaces and/or binder resin, leading to ply delamination of composite laminated structures and pure pipe failure. Other devices such as FRP underground storage tanks also exhibit premature microcracking and thus their corrosion resistance does not offer any additional advantages over similar metal structure.

Although microcracking can be mitigated by increasing the structural wall thickness, this solution drives the composite pipe cost up as compared to that of carbon steel structures. The higher cost constitutes a barrier to the substitution of FRP composite pipes for carbon steel in moderate to high (injection) pressure applications. Also, in downhole applications, the increased wall thickness prevents the use of composites where the diameter of the well bore is constrained, because of the cross-sectional area available for fluids to flow is smaller than that for carbon steel. The use of composites in these applications would require drill holes with larger diameter, and this gives rise to additional drilling costs.

Accordingly, it is a primary object of this invention to provide composite FRP structures having improved containment strength and which are more resistant to microcracking and delamination on the one hand and also have diminished wall thickness on the other hand such that the structure, e.g. pipe, is more compatible with carbon steel well bore/casing dimensions.

SUMMARY OF THE INVENTION

The invention provides a composite, fiber reinforced plastic structure having a wall portion defining a containment portion for the storage or passage of fluids or gases under high pressure, said wall portion comprising at least one layer comprising a plurality of continuous reinforcing fiberglass fibers having an average diameter of ≦about 10 microns impregnated in a resinous binder.

In another embodiment of the invention, the fiber reinforced plastic structure is a pipe comprising an elongated hollow tubular body wherein the continuous fibers are disposed at an angle of 0° up to 90° with respect to the longitudinal pipe axis.

In a more preferred embodiment, the wall structure of the pipe comprises at least two fiber reinforced layers in fixed laminar contact, a first of said layers comprising continuous fiberglass fibers having an average diameter of ≦about 10 microns impregnated in a resinous binder and disposed at an angle of 0° up to 90° with respect to the longitudinal pipe axis and said second layer containing continuous fiberglass fibers impregnated in a resinous binder and disposed at an angle with respect to the longitudinal pipe axis which differs from the angle of disposition of the fibers in said first layer.

Composite structures prepared in accordance with this invention exhibit an increased stiffness and containment strength in a direction normal to the reinforcing fiber axis due to the increased surface area of microfibers available for bonding to the resin matrix, as well as an improved resistance to microcracking after a prolonged period of use in the field. The composite structures also generally exhibit an increased longitudinal shear strength, also due to the increased surface area of microfibers available for bonding to the resin matrix.

DETAILED DESCRIPTION OF THE INVENTION

The invention relates to the utilization of micro-fibers (diameter≦about 10 μm, preferably<about 10 μm) in polymer composite laminates such that the strength and longevity of pressure containing devices made from such laminates is increased in oil and gas production/transmission application. Pressure containing devices include: pipes, downhole tubulars, casing, pipelines, pressure vessels, underground storage tanks, composite warps and like structures.

The example of glass fiber-reinforced composite pipe is shown below, where the containment pressure can be doubled (for fiber diameter of ≦4 μm) from current commercially available levels. This is based on the fact the performance of pressure containing devices is limited by poor mechanical properties of the individual laminates, in the diction normal to the fiber axis. The modification involves substituting glass microfibers (diameter ≦10 μm) for glass fibers currently in use (diameter between 14 and 24 μm). This substitution is shown by micro-structural mechanics computer methodology to increase stiffness and strength in the direction normal to the fiber axis, due to the increased surface area of microfibers available for bonding with the matrix. The use of micro-fibers therefore results in a substantial increase (up to a factor of two for fiber diameter of ≦4 μm) in device containment capability, particularly for downhole tubing and casing applications. Due to the greater surface area provided by micro-fibers, as compared to commercial fibers available for composite piping/tubing for oil/gas applications, a similar improvement (up to a factor of two) in composite shear properties is also expected, which should lead to substantial increase (up to a factor of two) in device containment capability, particularly for surface and buried piping applications.

Figure 1:
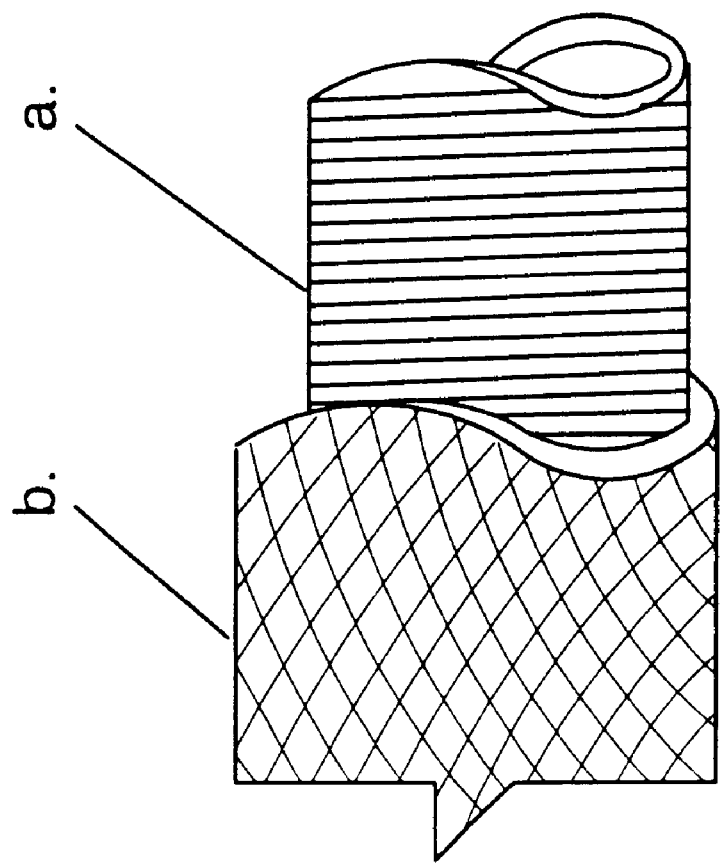
FIG. 1 is an elevation view in partial section of one embodiment of a composite, laminated pipe element of this invention.
Figure 2:
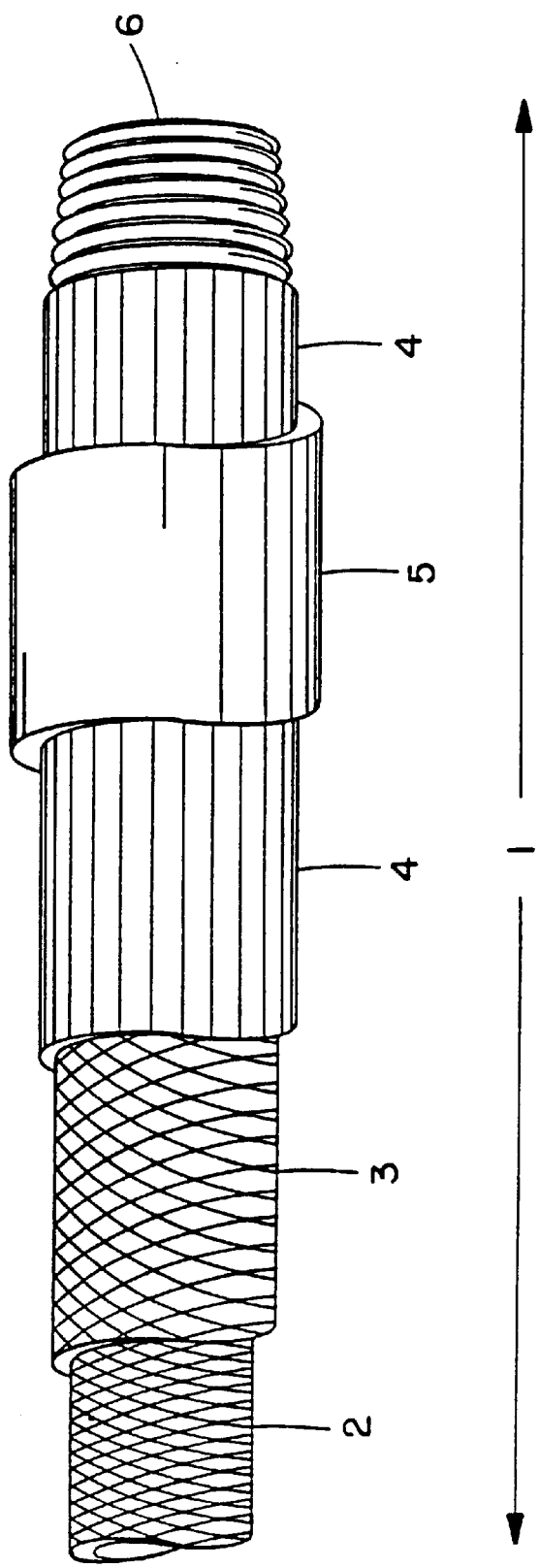
FIG. 2 is a schematic drawing in cross section of another embodiment of a composite, laminated pipe element of this invention.

Two embodiments of the present invention where the pressure containing device is a pipe are shown in FIGS. 1 and 2. FIG. 1 depicts a simple pipe construction of a two layer laminated pipe structure having an inner layer (a) comprising embedded fibers disposed at a 90° angle with respect to the longitudinal pipe axis in fixed contact with an outer layer (b) comprising embedded fibers disposed at a different angle, e.g. about +/−40° with respect to the longitudinal pipe axis.

FIG. 2 depicts a laminated FRP pipe specifically designed to support the hoop and axial load stress forces separately and is the subject matter of copending patent application [96CL 059] filed in the United States Patent and Trademark Office on even date herewith.

In a preferred embodiment of the invention where a pipe wall structure comprises a single fiber reinforced layer, the fiber may be disposed at an angle of 0° up to 90° more preferably from about +/−15° up to +/−75° with respect to the longitudinal pipe axis. Where the pipe wall comprises two or more fiber reinforced laminated layers as shown in FIGS. 1 and 2, the fibers in one layer are preferably disposed at an angle of greater than +/−60° up to 90°, and the fibers in the adjacent layer are preferably disposed at an angle of greater than about +/−30° up to +/−60°, each with respect to the longitudinal pipe axis.

FIG. 2 specifically shows an elevational view in partial section of a male threaded end section of pipe constructed in accordance with another embodiment of this invention. As shown, the pipe consists of an elongated hollow tubular body 1 constructed of three laminated fiber reinforced polymer layers shown at 2, 3 and 4 respectively and an optional fourth protective or wrapping layer shown at 5. The end section of the pipe shown at 6 comprises a male threaded tapered joint section cut or molded into outer reinforced layer 4. Reinforcing fibers shown forming helical patterns at 2 and 3 and a horizontal pattern at 4. The fiber patterns in FIG. 1 and FIG. 2. are drawn to illustrate fiber winding patterns and are not drawn to scale to show fiber winding density.

Layer 4 of FIG. 2 is the axial load bearing layer of the pipe and is designed to bear substantially all of the axial load exerted on the pipe when a number of pipe segments are coupled to form strings and the string is disposed either horizontally (i.e., above or below ground), or vertically (i.e., under water and/or into well bores). Axial load is transmitted along layer 4 through female threaded connectors or couplers (not shown) which are adapted to mate with two pipe ends which are to be joined during the construction of a pipe string. The taper and cut of male threaded joint section 6 extends into/onto axial load bearing layer 4, preferably to a degree short of reaching underlying layer 3.

The fibers present in binder layer 4 in FIG. 2 are disposed at an angle with respect to the longitudinal pipe axis designed to maximize the axial tensile load bearing properties of this layer, e.g., at an angle ranging from 0° up to +/−30°, more preferably up to about +/−15° and most preferably at about 0°. Fibers at 4 in FIG. 2 are shown disposed at a 0° angle with respect to the pipe axis, but it is understood that this angle may vary up to and including +/−30°.

Layer 3 shown in FIG. 2 is a hoop load bearing layer of the pipe and comprises a second layer in fixed contact with layer 4 and is disposed radially inward of layer 4. The reinforcing fibers present in layer 3 are disposed at an angle of greater than +/−30° with respect to the longitudinal pipe axis, more preferably greater than +/−40° and up to 90° with respect to the pipe axis. Where layer 3 is the sole hoop load bearing layer, the fibers are preferably disposed at an angle of at least +/−55°, more preferably about +/−70°, with respect to the pipe axis.

Layer 3 shown in FIG. 2 may be the sole hoop load bearing layer or hoop stress may be further accommodated by one or more optional additional layers such as layer 2, which is disposed radially inward of layer 3 and in fixed contact therewith. Layer 2 contains reinforcing fibers disposed preferably at an angle greater than the angle of disposition of the fibers in layer 3 and up to an angle of 90° with respect to the longitudinal pipe axis. Most preferably the fibers in layer 2 are disposed at an angle of at least +/−60° with respect to the pipe axis.

In a prefered embodiment of the invention where the pipe comprises three composite reinforcing layers, the fibers in layer 4 are disposed at an angle of about 0°, the fibers in layer 3 are disposed at an angle of +/−40° to +/−60° and preferably about +/−55°, and the fibers in layer 2 are disposed at an angle of greater than +/−60°, preferably about +/−70°, each with respect to the longitudinal pipe axis.

Layer 5 shown in FIG. 2 is an optional layer which may be applied as a protective layer or as a fiber reinforced winding layer to insure that the fibers in layer 4 are tightly bound in the resin binder. Layer 5 is not designed as an axial load bearing layer but may be simply a protective layer, and is cut away at the pipe ends prior to forming the tapered male threaded joint section 6.

Structures made in accordance with this invention may comprise a wall portion containing a single layer of resin impregnated fibers, (layer a in FIG. 1 or layer 2 in FIG. 2), or two or more layers in fixed contact as depicted in FIGS. 1 and 2.

The glass microfibers used in the present invention are extremely thin, having an average diameter of ≦10 microns, more preferably from about 3–9 microns, which distinguishes them from conventional glass fibers which have an average diameter of at least about 14 microns. Where the wall structure of the containment device comprises a single layer of resin impregnated fibers, the microfibers are used in that layer. Where the wall structure is a laminate of two or more different layers, the microfibers can be used in all layers or only in selected layers, with conventional glass or polymeric fibers being used in one or more other layers. Thus, in FIG. 1 layer (a) can comprise glass microfibers and layer (b) can comprise conventional glass fibers or other fibers such as graphite, aramide or Kevlar™ fibers. Similarly in FIG. 2 all of layers 2, 3, and 4 can comprise glass microfibers or only selected layers may comprise the glass microfibers.

Composite FRP structures of this invention e.g. pipes or cylinders, may be made by the well known wet filament winding process such as disclosed in the aforementioned U.S. Pat. No. 2,843,153. By this method, a bundle of continuous reinforcing filaments is impregnated with a fluid resin melt or resin solution, preferably an uncured thermosetting resin, and fed under tension through a shuttle which traverses back and forth over a rotating mandrel. Alternatively, the rotating mandrel itself may traverse back and forth and the shuttle may be in a fixed position.

The impregnated fiber bundles are built up along the mandrel in close proximity or abutting one another and may form crisscross (helical) patterns as they are built up one layer atop another until the desired layer thickness is achieved. The angle of disposition of the fibers with respect to the mandrel longitudinal axis may be largely controlled as a function of the lateral speed of the shuttle as it traverses the mandrel. After the desired thickness of the initial layer is achieved, e.g., layer (a) in FIG. 1 or layer 2 in FIG. 2, the lay down process is discontinued and the single layer structure is cured and removed from the mandrel. Where wall structures of two or more layer are to be made, the process is adjusted to lay down a second layer of resin impregnated fibers at an angle different than that of the initial layer, and so on. Axial load bearing layer 4 in FIG. 2 may also be applied using the filament winding technique except where the fibers are disposed at an angle of 0° with respect to the mandrel axis. In this latter case, the axial load bearing layer of desired thickness is applied as a resin saturated prepeg tape or sleeve which can be laid up by hand. Alternatively, a longitudinal lay down method may be used where 0° fibers are laid on the mandrel atop layer 3 while being captured by a 90° outer wrap, such as illustrated at 5 in FIG. 2.

Other structures such as tanks and pressure vessels may also be made using the above filament winding process using a larger diameter mandrel, or by the lay up of resin fiber prepegs over a forming structure or mold.

The resinous material which serves as a binder for the reinforcing fibers is preferably a thermoset resin such as an epoxy. The preferred epoxy resins for carrying out the invention include bishpenol—A diglycidyl ester, bisphenol glycidyl ether, novolac resin glycidyl ether and aliphatic polyepoxide, though other suitable epoxy resins may be used. Aside from epoxy resins, other suitable thermosetting polymers include phenolic resins, unsaturated polyesters and polyimides. The degree of condensation of these resins is selected so that the viscosity of the resin product is adapted to the working conditions necessary for formation of the tubular body. The thermosetting polymers are mixed with suitable hardeners, such as aromatic polyamines, polyamides, aliphatic polyamines, polyacids, polyanhydrides, dicyandiamides, primary or secondary amines, mixtures of these, or any other of the hardeners typically used to crosslink thermosetting resins. Thermoplastic resins such as polyphenylene ethers, polysulfones, ABS resins and the like may also be used, but these are less preferred.

The quantity of resin applied to the glass microfibers in forming the structure should be sufficient such that the volume fraction of fiber present in the cured product is at least about 40%, more preferably at least about 50% and most preferably in the range of about 60% to 70%, with the balance being the resin composition.

The microglass or conventional glass reinforcing fibers used herein are supplied in the form of filaments or filament bundles. Most preferably, the individual fibers are coated with a material which will enhance the adhesion and wettability of the glass fiber surfaces with respect to the particular resin used as a binder. Aminopolysiloxane materials are particularly suited for this purpose.

After the resin-wetted composite structure is assembled on the mandrel, the thermosettable resin, e.g., epoxy resin, is cured by heating the structure to a temperature sufficient to cure the resin, e.g., 100–170° C., for a period of time ranging from about 30 minutes up to 12 hours, after which the assembly is removed from the mandrel. Thermoplastic resins need not be cured, but simply cooled on the mandrel prior to removal.

The wall thickness of composite FRP structures made in accordance with this invention may generally range from about 0.1 inch up to about 2.0 inches. Pipe diameters can range from about 1 to 36 inches. Common pipe dimensions consist of 4 inch inside diameter and 0.16 inch wall thickness. Common tubing dimensions comprise 2 inch inside diameter and 0.4 inch wall thickness. Where wall structures are made in accordance with this invention using two or more FRP laminated layers, it is preferred that the layer(s) containing the glass microfibers of this invention constitute at least 30% more preferably at least 50% of the overall wall thickness.

An epoxy resin binder material used in FRP pipe construction has a visco-elastic nature, and in consequence, the piping/tubing mechanical properties such as strength decrease as a function of time. There exists well-established qualification procedures to determine the long term design (hoop) strength of a composite pipe. This involves subjecting a composite pipe to cyclic pressure (at 150° F.), which is appropriate for applications with pressure≦or equal to 1000 psig, or to constant pressure, which is deemed appropriate for applications with pressure greater than 1000 psig. The hoop stress value at which loss of pipe containment integrity is observed is recorded. Data is extrapolated from a testing period of about one year to 10 or 20 year service, as needed. Conventional composite pressure containing devices subjected to this qualification procedure exhibit a long term (about 20 years) hoop design stress of 10 to 12 ksi for composite piping applications, and a long term axial and hoop design stress of 6 to 7 ksi for composite downhole tubing/casing applications.

Figure 3:
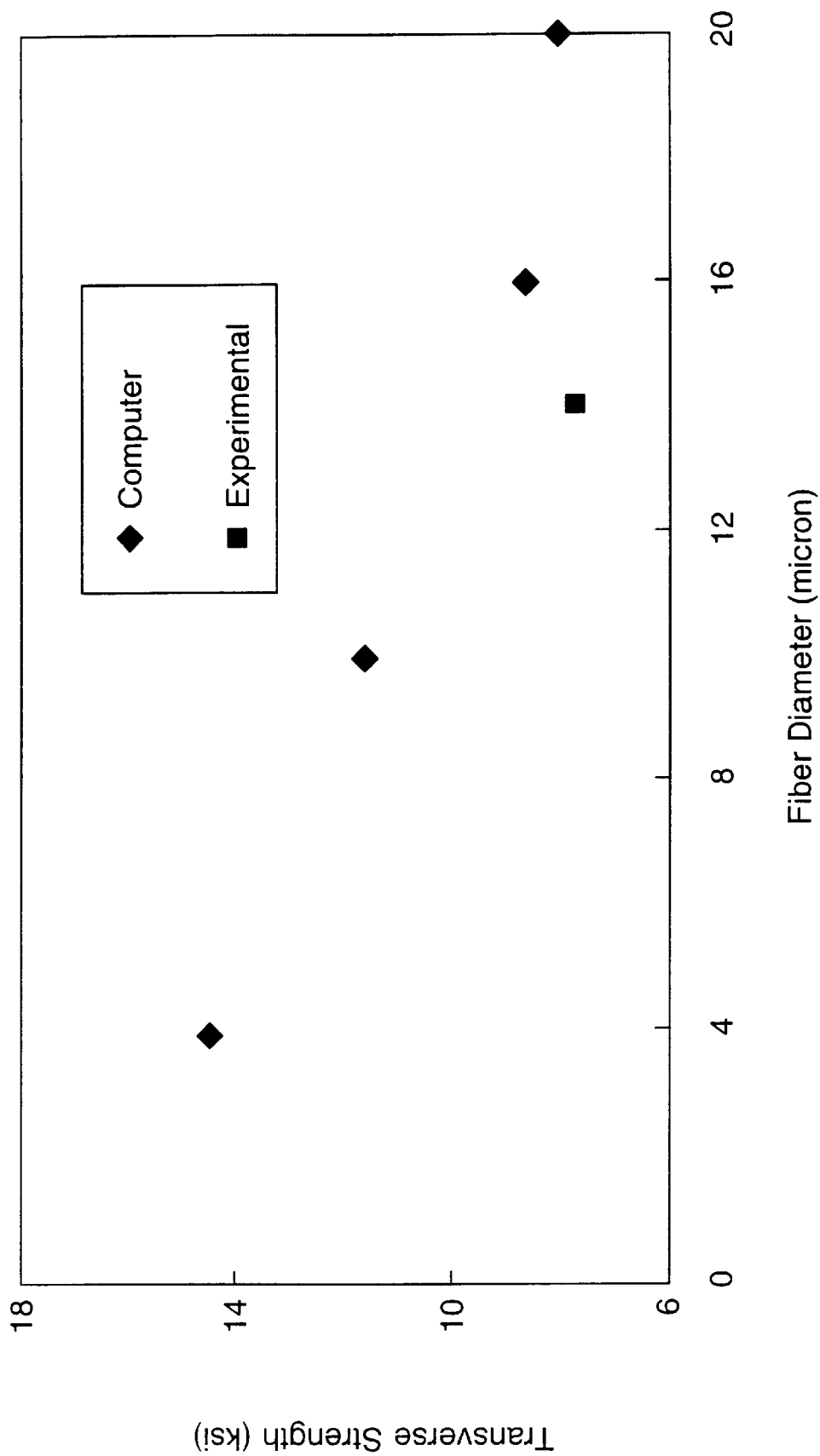
FIG. 3 is a graph plotting composite transverse strength as a function of glass fiber diameter as predicted by microstructural mechanics computer model as compared to a measured value, for a fiber volume fraction of 60%.

In order to demonstrate the improved composite strength in a direction normal to the impregnated glass fibers, a microstructural mechanics computer methodology is used to predict the laminate strength in the direction normal to the fiber axis as a function of fiber diameter. The model is validated by comparison with the transverse composite strength value deduced from the axial strength of a commercial pipe made with +/−55° wound fibers, having an average fiber diameter of about 14 microns. The commercial pipe has a 60% glass volume fraction, 4 inch inside diameter and 0.16 inch wall thickness. The axial strength of the commercial +/−55° wound pipe is measured to be 11.2 ksi, which corresponds to a composite transverse strength of approximately 7.5 ksi (i.e., 11.2 ksi times $\sin^2 55°$=7.5 ksi)j. FIG. 3 shows the computer model predictions obtained for a typical epoxy matrix and a fiber volume fraction of 60%. The agreement between the model prediction for the composite transverse strength (fiber diameter of 14 micron), i.e., about 8.5 ksi and the experimentally determined value of 7.5 ksi is fairly good.

Figure 4:
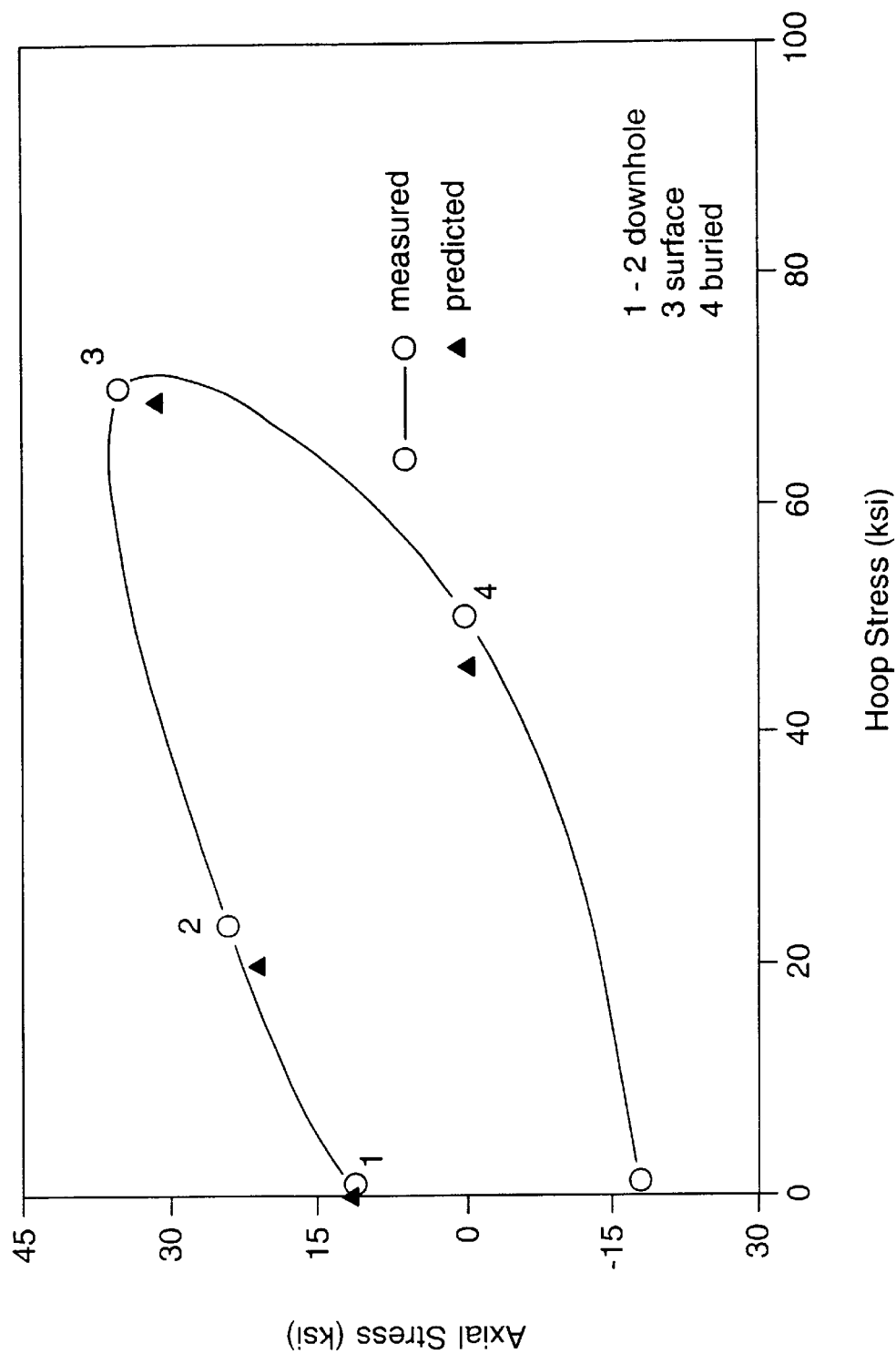
FIG. 4 is a graph showing short term failure envelope measured for a composite pipe having +/−55° disposed fiber and predictions from a theoretical computer methodology.

FIG. 4 displays a measured short-term multi-axial failure envelope (open circles) for the +/−55° lay up composite pipe (epoxy Young's modulus of 430 ksi, and a tensile strength of 10 ksi) subjected to different petrochemical service conditions. 1. is for pure axial stress, 2. is for axial stress equal to hoop stress, 3. is for hoop stress twice the axial stress and 4. is for a pure hoop stress only. Conditions 1 and 2 are relevant to downhole applications (tubing, casing and injection tubing) while 3. is relevant to surface pipe and 4. to buried pipe applications respectively. Using a solid mechanics treatment incorporating the glass epoxy laminate properties directly measured from the 90 degree wound pipe (the laminate transverse and shear stress/strain curves) the short-term experimental failure envelope is matched with a 10% error by the results (fill triangles) obtained by the above theoretical methodology.

Figure 5:
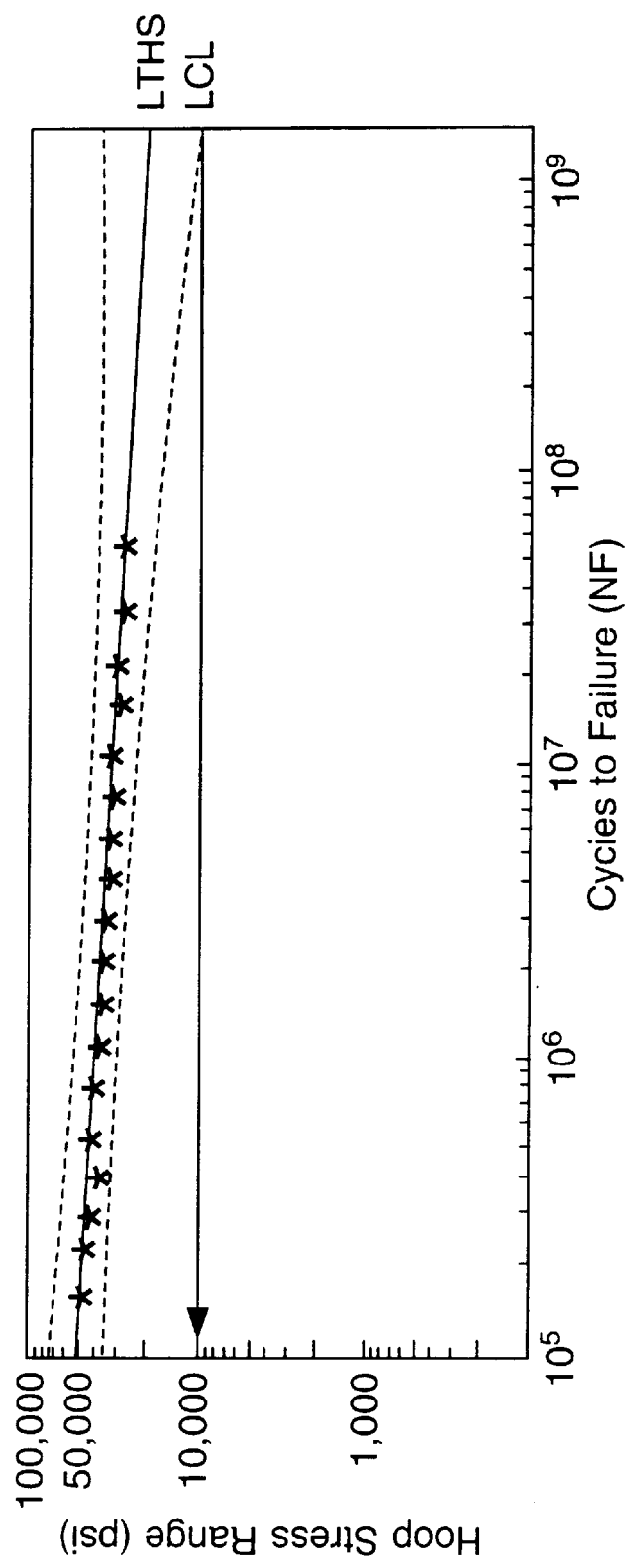
FIG. 5 is a graph showing long term hoop design strength for a composite pipe having +/−55° disposed fiber subject to cyclic pressure at 200 cycles/min.
Figure 6:
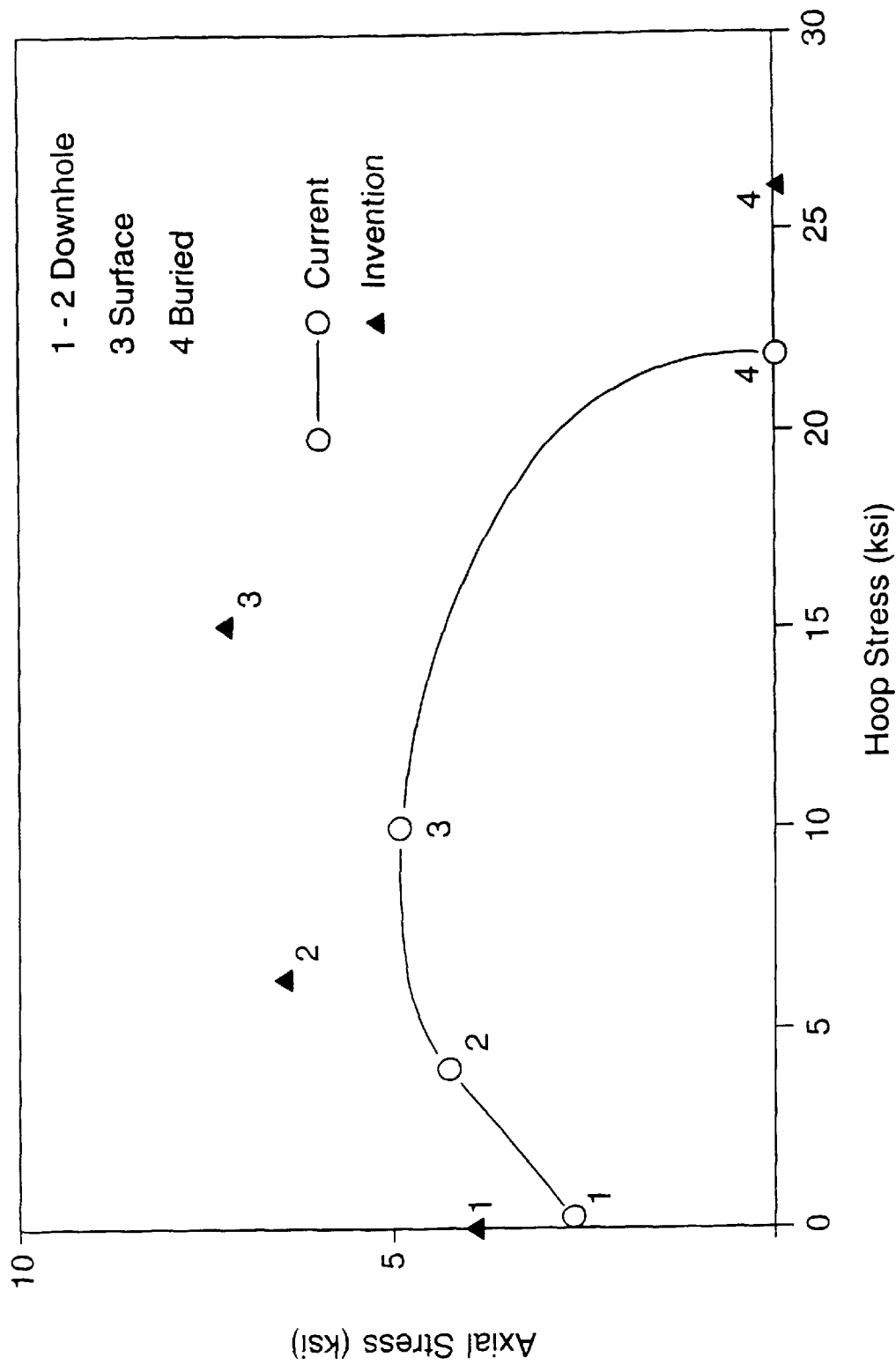
FIG. 6 is a graph showing the long term failure envelope of conventional composite pipe having +/−55° disposed fibers having a diameter of 14 microns vs. pipe of the invention containing 7 micron diameter fibers.

In order to determine the long-term failure envelope, the long term design hoop strength of the above mentioned +/−55 degree wound pipe must be obtained according to qualification procedure API 15LR (cyclic service pressure≦1000 psig), as depicted by FIG. 5. A pure pressure test is equivalent to loading condition 3 in FIG. 4. After extrpolation of the data to about a 20 year service life, the lower confidence level (LCL) of the long term hoop stress (LTHS) is about 10,000 psi, or 10 ksi. The long term composite transverse and shear strength are obtained by adjusting the composite strength parameters in the theoretical methodology until the predicted hoop strength for condition 3 is 10 ksi, as measured on FIG. 5. The long-term transverse composite strength is now 1.8 ksi, as compared to a short-term value of 7.5 ksi. Similarly, the long-term composite shear strength is 2.6 ksi, as compared to a short-term value of 10.7 ksi. The result from this procedure is shown in FIG. 6 (open circles). Condition 3. represents the experimentally measured data of FIG. 5, while the other conditions represent model predictions based on long-term composite properties derived from experimental point 3.

The projected performance of the invention is obtained by theoretically predicting the long-term failure envelope based upon the long term mechanical properties of a composite laminate made with a fiber whose diameter is 7 $\mu$m. FIG. 3 shows that the short term transverse composite strength of a pipe made with 7 $\mu$m glass fiber is roughly 1.5 times greater than that of a composite laminate made with 14 $\mu$m glass fiber. The assumption is at there is a similar short term composite shear strength increase. It is assumed that the long term 7 $\mu$m glass fiber composite transverse and shear strength are also 1.5 times greater than conventional 14 $\mu$m glass fiber composites. The reason is that he transverse Young's and shear modulus of a 7 $\mu$m glass fiber composite are the same (if not greater) than for a 14 $\mu$m glass fiber composite. This implies that the fatigue behavior or creep rupture behavior of a micro fiber composite is the same (if not better) than that of conventional fiber composites. Fatigue behavior (cyclic loads) or creep rupture behavior (static loads) determines the magnitude of the long term composite strength. The long term predicted failure envelope for the invention is shown in FIG. 6 (full triangles). Points 1, 2 and 3 for the invention are 1.5 times greater than that of conventional 14 $\mu$m fiber composite pipes, while point 4 is 1.2 times greater than that for the same conventional composites. Note that if the shear strength remains constant, point 3 for the invention is 40% greater; point 2, 30% greater, point 1, 15% greater and point 4 is not increased as compared to conventional 14 $\mu$m fiber composites.

The improvement in transverse composite strength of FRP pipe made in accordance with this invention is demonstrated in Example 1.

EXAMPLE 1

Three different fiber reinforced composite pipes were constructed by the fiber winding process described above to provide pipe structures having a nominal 2 inch inside diameter and a nominal wall thickness of 0.1 inch. Each pipe was wound at a 90° fiber angle with respect to the longitudinal pipe axis and contained a fiber volume fraction of about 46%. Pipe A, B and C were constructed using glass fibers having an average diameter of about 7, 14 and 24 µm respectively. The relative composite transverse strength of each pipe was evaluated by clamping a segment of each sample in the jaws of an Instron™ testing machine and applying transverse (pulling) stress to the samples. The approximate stress and strain at break for each pipe evaluated under identical test conditions was recorded and is shown in Table 1.

TABLE 1

| Fiber Diameter (µm) | Stress at Break (psi) | Strain at Break (in/in) |
|---|---|---|
| A-7 | $4.6 \times 10^3$ | $4.25 \times 10^{-3}$ |
| B-14 | $3.6 \times 10^3$ | $3.0 \times 10^{-3}$ |
| C-24 | $3.2 \times 10^3$ | $2.75 \times 10^{-3}$ |

As is evident from Table 1, the 7 µm fiber composite out performs the 14 and 24 µm fiber composite by about 30% and 40%, respectively, which is in fair agreement (given the fact the glass volume fraction is 46% in this case, and not 60%) with model predictions of about a 50% strength increase achieved with 7 vs. 14 µm fibers for a fiber volume fraction of 60% as shown in FIG. 3.

What is claimed is:

1. A composite, fiber reinforced plastic structure having a wall portion defining a containment portion for the storage or passage of fluids or gases in contact therewith under high pressure, said wall portion comprising at least one layer comprising a plurality of continuous reinforcing fiberglass fibers having an average diameter of ≦about 10 microns impregnated in a resinous binder.

2. The article of claim 1 wherein said structure is a pipe comprising an elongated hollow tubular body and wherein said continuous fibers are disposed at an angle of 0° up to 90° with respect to the longitudinal pipe axis.

3. The pipe of claim 2 wherein said continuous fibers are disposed to form a helical filament winding pattern forming an angle between about +/−15° up to about +/−75° with respect to said longitudinal pipe axis.

4. The structure of claim 1 wherein said fibers comprise at least about 40% of the volume fraction of said wall portion.

5. The structure of claim 4 wherein said fibers comprise at least about 60% of the volume fraction of said wall potion.

6. The structure of claim 1 wherein said resinous binder is a thermoset resin.

7. The structure of claim 6 wherein said thermoset resin is an epoxy resin.

8. The structure of claim 1 wherein said fibers have an average diameter between about 3 and 9 microns.

9. The pipe of claim 2 wherein said wall structure comprises at least two fiber reinforced layers in fixed laminar contact, a first of said layers comprising said continuous fiberglass fibers having an average diameter of ≦about 10 microns impregnated in a resinous binder and disposed at an angle of 0° up to 90° with respect to said longitudinal pipe axis and a second layer containing continuous fiberglass fibers impregnated in a resinous binder and disposed at an angle with respect to said longitudinal pipe axis which differs from the angle of disposition of said fibers in said first layer.

10. The pipe of claim 9 wherein the fibers in said first layer are disposed at an angle of greater than +/−60° up to 90° with respect to said longitudinal pipe axis and the fibers in said second layer are disposed at an angle greater than about +/−30° up to +/−60° with respect to said longitudinal pipe axis.

11. The pipe of claim 9 wherein the fibers present in said second layer have an average diameter of ≦about 10 microns.

12. The pipe of claim 9 wherein said first layer of said pipe is an outer axial load-bearing layer.

13. The pipe of claim 9 wherein said first layer of said pipe is an internal hoop load-bearing layer.

* * * * *